United States Patent Office 2,877,193
Patented Mar. 10, 1959

2,877,193

STABILIZATION OF POLYURETHANE REACTION PRODUCTS

Philip A. Roussel, Wilmington, Del., assignor to E. I. du Pont de Nemours & Company, Wilmington, Del., a corporation of Delaware No Drawing. Application February 23, 1955
Serial No. 490,119

7 Claims. (Cl. 260—18)

This invention relates to polyurethane products useful in the formation of cellular reaction products, and more particularly to products of this sort formed by reactions involving an arylene diisocyanate and a triglyceride of a hydroxyl-containing fatty acid. Still more particularly it relates to the stabilization of such polyurethane products against deterioration during storage at low temperatures.

When polyurethane products of this type which contain free unreacted arylene diisocyanate and which are capable of reacting with water to form foams are stored at temperatures below about 20° C. for more than a few days, the foamed plastics derived from these polyurethane products exhibit marked changes. Foams prepared from such liquid polyurethanes which have been stored at low temperature are characterized by poor cell structure, the degree of coarseness being roughly proportional to the length of time of storage at low temperature. When foams are prepared from two samples of the same typical polyurethane product which has been stored in one case for one week at low temperature and in another case for four weeks, the former sample may contain cells of ⅛ to ¹⁄₁₆" diameter while the latter may contain cells of from ¼ to ½" diameter. After longer periods of storage, the liquid polyurethane product is frequently entirely unsuitable for the production of foamed products. Usually after about two weeks of storage at temperatures between 0 and 20° C., foams resulting from the fluid polyurethane product have inferior structure, impaired strength, and reduced thermal insulating value as compared with foams made from a similar polyurethane product which has not been exposed to low temperatures.

Deterioration of the polyurethane products during storage may be at least partially corrected by heating the polyurethane product after storage, before reacting it with water to produce foam. Thus a liquid polyurethane which has deteriorated in this manner may be heated to 50 or 60° C. for 30 minutes and cooled, after which it can be reacted with water and a catalyst to produce a cellular plastic material which is quite satisfactory. A product heat treated in this way remains stable only until it is once again stored at low temperature. With polyurethane products which have been stored for relatively short periods, at low temperature, usually less than two weeks, it is also possible to improve the properties of the foam made therefrom by vigorously agitating the product before and during the addition of water. Both of these are temporary methods in that the improvement secured is lost in case the polyurethane product is again stored at low temperature.

According to the present invention, it has now been found that polyurethane product containing the reaction residues of a fatty acid triglyceride having a hydroxyl number of at least 49 and of an arylene diisocyanate, said product containing unreacted arylene diisocyanate and being capable of forming cellular reaction products upon reaction with water, can be stabilized against deterioration upon storage at low temperatures by providing in intimate contact therewith a substituted urea having the formula RNHCONH—R'NCO in which R represents a monovalent organic radical from the group consisting of saturated and olefinically unsaturated radicals containing at least four carbon atoms, and R' is an arylene radical. The amount of the substituted urea used is the amount equivalent to from 0.05 to 2 parts by weight of the corresponding primary amine $RNH_2$ per hundred parts of polyurethane product. As the polyurethane product already contains unreacted arylene diisocyanate, a convenient means of providing the substituted urea stabilizer consists in incorporating with the polyurethane product a suitable amount of the corresponding primary amine, which thereupon reacts in situ with the diisocyanate to form the substituted urea.

In carrying out the process of this invention, the primary amine or the corresponding substituted urea is incorporated into the fluid polyurethane product by mixing, either mechanically or by hand. As these stabilizing agents are normally soluble in the liquid polyurethane product, no difficulty is encountered in obtaining a satisfactory distribution of the agent. As little as 0.05 part by weight of the primary amine per hundred parts of polyurethane product has been found effective. Smaller amounts do not in general produce enough stabilization to be practicable. While amounts greater than 2 parts by weight of the amine or a corresponding amount of a substituted urea do not interfere with stabilization, the use of such amounts is unnecessary and wasteful.

Polyurethane products which may be stabilized by the process of this invention include the products described in U. S. Patent 2,787,601. These products are obtained by reacting an excess of an arylene diisocyanate with a fatty acid triglyceride having a hydroxyl number of at least 49 to form a polyurethane product containing unreacted isocyanate. In such a product, the triglyceride and the diisocyanate are preferably used in such relative amounts that the ratio of the triglyceride hydroxyl groups to isocyanate groups is from 0.45:2 to 0.95:2.

The process of this invention is also applicable with polyurethane products made by the reaction of an arylene diisocyanate with a triglyceride of a hydroxyl-containing fatty acid which has been modified by reaction with an epoxy resin. Such products are described in U. S. Patent 2,788,335.

A preferred type of polyurethane product is that described in U. S. Patent 2,833,730. These products are formed by the reaction between an arylene diisocyanate, a fatty acid triglyceride having a hydroxyl number of at least 49, and a low molecular weight compound containing a plurality of hydroxyl groups. These reagents are used in such relative amounts that the ratio of hydroxyl groups present in the low molecular weight polyhydroxy compound to triglyceride hydroxyl groups is from 0.6:1 to 2.3:1, and the ratio of the combined total number of hydroxyl groups present in the triglyceride and in the polyhydroxy compound to the number of isocyanate groups present in the arylene diisocyanate is from 0.65:2 to 1.0:2. When the ratio of the hydroxyl groups in the low molecular weight polyhydroxy compound to triglyceride hydroxyl groups is below about 0.6:1, the ultimate foamed resin exhibits more shrinkage than is desirable, while with ratios above about 2.3:1, the resulting foams, although free from shrinkage, tend to be brittle and to have less desirable physical properties. If smaller amounts of the diisocyanate are used than stated above, the resulting plastic foams become softer and more pliable and have undesirably low softening points. When too large an excess of diisocyanate is used, the resulting products are brittle, friable plastic foams lacking in abrasion resistance.

In all these products, the fatty acid triglyceride is preferably a naturally occurring oil or derivative thereof. It may be an oil such as castor oil or may be a blown drying oil of the type known in the trade as "heavy-bodied" oils, such as blown linseed, tung, poppyseed, hempseed, soya oils and the like. The triglyceride should have a hydroxyl number of at least 49. If a triglyceride having too low a hydroxyl number is used, and if the prescribed ratio between hydroxyl groups and isocyanate groups is observed, the resulting reaction product will contain an insufficient number of unreacted isocyanate groups for the subsequent reaction with water and the final product will not be properly foamed or properly set. If additional diisocyanate is added to overcome this deficiency, a more brittle and less desirable cellular product is obtained. Triglycerides having hydroxyl numbers up to 180 may be used. This value is the hydroxyl number of the pure triglyceride or ricinoleic acid, and is not a limitation except from a practical standpoint. Naturally occurring oils with higher hydroxyl numbers are not known, and it is difficult to oxidize unsaturated oils to such an extent that the oxidation product has a hydroxyl number greater than 180.

When a low molecular weight polyhydroxy compound is used in the reaction leading to the formation of the polyurethane product, this compound preferably contains 2, 3 or 4 hydroxyl groups. Compounds having molecular weights below about 250 are preferred. Among the compounds useful in this connection are polyhydroxysubstituted hydrocarbons having from about 2 to 10 carbon atoms, such as ethylene glycol, propylene glycol, trimethylolpropane, trimethylolethane, the isomeric di- and trihydroxy butanes, pentaerythritol, and glycerin; polyhydroxy ethers such as polyethylene or polypropylene glycols; and polyhydroxy thioethers such as thio-diethylene glycol.

Any of a wide variety of arylene diisocyanates may be employed in the reaction, including such representative compounds as 2,4-tolylene diisocyanate, m-phenylene diisocyanate, 4-chloro-1,3-phenylene diisocyanate, 4,4'-biphenylene diisocyanate and 1,5-naphthylene diisocyanate. The term "arylene diisocyanate" is intended to refer to a compound in which each of the two isocyanate groups is attached directly to an aromatic ring. It is not necessary that both isocyanate groups be attached to the same aromatic ring.

The reaction between the triglyceride and the diisocyanate, with or without the low molecular weight polyhydroxy compound or an epoxy resin, takes place readily with or without the application of external heat. By using the proportions of reagents shown above, an intermediate polyurethane product is obtained having a viscosity within the range of from about 750 to 75,000 centipoises at 30° C.

As previously indicated, the substituted urea stabilizer is a reaction product of an arylene diisocyanate and a primary amine having the formula $RNH_2$ in which R represents a monovalent organic radical from the class consisting of saturated and olefinic unsaturated radicals, containing at least 4 carbon atoms. The amine may have a straight or a branched chain and may be alkyl or cycloalkyl. Typical amines useful in this invention include n-butylamine, isobutylamine, tert-butylamine, n-amylamine, n-hexylamine, cyclohexylamine, 2-ethylhexylamine, 2,3-dimethylhexylamine, n-octylamine, n-decylamine, n-tetradecylamine, n-hexadecylamine, n-octadecylamine, 9-hexadecenylamine, 9,10-octadecyldienylamine, abietylamine and the like. Halogen, alkyl, alkoxy and other substituents which do not react with isocyanate groups may be attached to the hydrocarbon portion of the amine, but carboxyl and other groups reactive with isocyanate should be avoided. Any of the arylene diisocyanates of the type mentioned previously as being useful in the formation of polyurethane product are also useful as reactants in the formation of the substituted urea stabilizer. When the stabilizer is formed in situ by addition of an amine to the polyurethane product, the diisocyanate will of course be that present in the polyurethane product.

The intermediate stabilized polyurethane product is converted to the ultimate cellular plastic material by mixing it with water, ordinarily in the presence of a tertiary amine catalyst. The reaction mass immediately begins to foam due to the reaction of the unreacted isocyanate groups with the water to form $CO_2$ and substituted ureas. If the product is confined in a formed space, the foam will fill up that space and in a relatively short time will cure at room temperature to a firm, cellular plastic material that is resistant to damage by compression and displays little shrinkage upon standing. Enough water should be used to react with the unreacted isocyanate groups present in the intermediate polymer but there should not be a large excess. If too much water is used, the excess remains in the foam and acts as a plasticizer. If too little water is used, the unreacted isocyanate groups will tend to give instability and to produce excessive cross-linking and will result in brittle foams. Stated empirically, the amount of water used will ordinarily be between about 0.4 and 1.7 moles per mole of arylene diisocyanate used in preparing the intermediate polyurethane product.

A tertiary amine catalyst is preferably added with the water to form the cellular product. This catalyst may be omitted if longer reaction times or elevated temperatures are used. The tertiary amine catalyst is preferably of low volatility to avoid loss by evaporation and objectionable odor. Suitable compounds include triethylamine, diethylcyclohexylamine, dimethylhexadecylamine, dimethylcetylamine, triethanolamine, pyridine, quinoline and the like.

It is frequently desirable to use a dispersing agent in the water as it is mixed with the intermediate product. Usually from 0.5 to 1% of dispersing agent, based on the amount of polyurethane product, is sufficient; however, some of the higher molecular weight compounds hereinafter mentioned which assist in forming the dispersion also operate as modifiers of the resulting cellular plastic material, and therefore may be used in larger amounts. Among the dispersing agents which have been found to be satisfactory are: sodium carboxymethyl cellulose, lignin sulfonates, the lauric acid ester of triethanolamine, gelatine, and the diethyl cyclohexylamine salts of alkyl sulfates containing from 12 to 16 carbon atoms.

Instead of using only one each of the various reactants used in the preparation of the plastic foams, mixtures of two or more of any of these compounds may be used. Additives such as fillers, extenders, modifiers, etc., may also be incorporated into the material to give various effects to the sponge structure. Generally speaking these materials give more rigid, more brittle and more dense products. Consequently, when they are used they are added in minor amounts. Such products include magnesium carbonate, powdered wood cellulose, bentonite, silicon dioxide, calcium silicate, carbon black, glass fiber, magnesium stearate, methylene distearamide, etc. Magnesium stearate appears to cause somewhat larger cell structure and somewhat thicker cell walls.

The mechanism by which this invention operates is not fully understood but it is believed that excess unreacted arylene diisocyanate is poorly soluble in the liquid polyurethane. As the temperature of the liquid resin is lowered, the solubility of the unreacted diisocyanate is further decreased. When temperatures near 0° are reached, the diisocyanate apparently becomes only very slightly soluble and begins to separate from the polyurethane resin. The separation is a slow process because of the high viscosity of the medium especially at the low temperatures. The separation process therefore requires some time before its effect becomes evident when the polyurethane product is reacted with water and catalyst to prepare foams. It is believed that the arylene diisocyanate passes through a stage of incipient crystallization, separating into aggregates which may or may not be crystalline. These aggregates increase in size with time, and upon reaction with water and catalyst cause the liquid polymer to release large amounts of carbon dioxide in rather small areas. This produces a foam structure containing large cells. The longer the cold storage time, the larger the aggregates and the resulting cells of the foamed product become, and the less desirable are the properties of the foam. When the primary amines of this invention are incorporated into the liquid polyurethane composition, it is believed that they react with the excess aromatic diisocyanate to form substituted ureas. These reaction products apparently act as dispersing agents and either prevent the formation of any crystalline or crystal-like aggregates or effectively keep them dispersed and prevent aggregates from being formed. That the amines of this invention are so effective is quite surprising since conventional dispersing agents such as alcohol sulfates and their salts, fatty acids and their salts, castor oil-ethylene oxide condensates, glycerol stearates, and the like, are not effective in stabilizing liquid polyurethane products against deterioration at low temperature. Evidence that the substituted urea is the active agent can be found from the fact that such storage stability results from addition of one of these substituted ureas in place of an amine. For example, when tolylene diisocyanate is used to prepare a liquid polyurethane product for ultimate conversion to plastic foam, the polyurethane can be stabilized to storage by incorporation of a primary amine such as dodecylamine, which is thought to react with the excess tolylene diisocyanate present in the product to form N-dodecyl-N'(o-isocyanatotolyl)urea which is the active dispersing agent. However, instead of forming this urea in situ, it can be prepared separately and incorporated into the liquid polyurethane with equal effect on storage stability. For economic reasons, it is usually preferable to add the stabilizing agent in the form of the amine rather than as the substituted urea.

The process of this invention and the properties of plastic foams prepared by its use are illustrated in the following examples, in which parts are by weight unless otherwise stated:

Example 1

100 parts of 2,4-tolylene diisocyanate are added to a mixture of 85 parts of castor oil having a hydroxyl number of 160 and 15 parts of a polyethylene glycol having a molecular weight of about 200. An exothermic reaction begins at once and proceeds readily without application of external heating or cooling. The resulting liquid polyurethane resin is allowed to cool to room temperature and is ready for use.

Fractions consisting of 33 parts of this polyurethane resin are used for testing. Each fraction is treated with a different amount of a commercial amine mixture consisting of 8 parts octylamine, 9 parts decylamine, 47 parts dodecylamine, 18 parts tetradecylamine, 8 parts hexadecylamine, 5 parts octadecylamine, and 5 parts octadecenylamine. The amine mixture is added and mixed in by hand. The treated fractions are then stored at 0° C. for periods of from 5 to 186 days. After removal from the cold chest, the resins are foamed by adding to the stored resin a mixture of 1.20 parts of water and 0.89 part of diethyl ethanolamine catalyst. This mixture is stirred thoroughly by a hand paddle for about 1 minute and poured into a mold 4 inches on a side. After 3 to 5 minutes standing at room temperature, the $CO_2$ which evolves foams the plastic to maximum volume. The plastic foam is then removed from the mold and examined visually. The following table shows the amounts of stabilizer used, the storage time at 0° C. and the results obtained.

| Concentration (gm. amine per 100 gm. polymer) | Days' Storage at 0° C. before foaming | Quality of Foamed Resin [1] |
|---|---|---|
| 0 | 5 | P |
| 0.05 | 14 | G |
| 0.10 | 14 | G |
| 0.25 | 14 | E |
| 0.50 | 14 | E |
| 1.0 | 11 | E |
| 1.0 | 20 | E |
| 1.0 | 160 | G |
| 1.0 | 186 | G |
| 2.0 | 160 | E |
| 2.0 | 186 | E |

[1] P=Poor; very coarse cell structure, not satisfactory. G=Good; very slight coarseness present. E=Excellent; extremely slight or no coarse cells present.

Example 2

The procedure described in Example 1 is repeated using various other amines at a 0.5% concentration. The results obtained are as follows:

| Amine | Days' Storage at 0° C. before foaming | Quality of foamed resin |
|---|---|---|
| None | 5 | P |
| Do | 41 | P |
| n-Butylamine | 15 | G |
| Do | 41 | G |
| n-Octylamine | 15 | G |
| Do | 41 | G |
| Dodecylamine | 15 | G |
| Do | 41 | G |
| Oleyl amine | 15 | G |
| Do | 41 | G |

Example 3

A sample of the polyurethane reaction product described in Example 1 is mixed with 1% by weight of N-dodecyl-N'-(o-isocyanatotolyl)urea, previously formed by the reaction between dodecylamine and 2,4-tolylene diisocyanate. After mixing by hand, the treated sample is stored at 0° C. for 12 days. The resin is then foamed using the procedure described in Example 1, and yields a plastic foam of excellent texture which is almost completely free of coarse cells.

I claim:

1. A fluid polyurethane product containing the reaction products of a fatty acid triglyceride having a hydroxyl number of from 49 to 180, said triglyceride being selected from the group consisting of castor oil and blown drying oils, and of an arylene diisocyanate, said fluid polyurethane product being substantially free of urea linkages and containing unreacted arylene diisocyanate and being capable of reacting with water to form a cellular reaction product, stabilized against deterioration upon storage at low temperatures by the presence of a substituted urea having the formula R—NHCONH—R'NCO in which R represents a monovalent organic radical which is inert to isocyanate groups, said radical being selected from the group consisting of aliphatic and cycloaliphatic radicals containing at least 4 carbon atoms and R' is an arylene group, the amount of the said substituted urea being equivalent to from 0.05 to 2 parts by weight of the corresponding primary amine $RNH_2$ per hundred parts of polyurethane product.

2. The product of claim 1 in which the substituted urea is a reaction product of a primary aliphatic amine containing at least 4 carbon atoms with a tolylene diisocyanate.

3. A fluid polyurethane product capable of reacting with water to form a cellular reaction product, said polyurethane product consisting essentially of the reaction product of an arylene diisocyanate, a fatty acid triglyceride having a hydroxyl number of from 49 to 180, said triglyceride being selected from the group consisting of castor oil and blown drying oils, and an organic polyhydric alcohol having a molecular weight below about 250, said alcohol containing from 2 to 4 hydroxyl groups and having from about 2 to 10 carbon atoms, the said reagents being used in such relative amounts that the ratio of hydroxyl groups in the low molecular weight polyhydroxy compound to hydroxyl groups in the triglyceride is from 0.6:1 to 2.3:1 and the ratio of the combined total number of hydroxyl groups present in the triglyceride and in the polyhydroxy compound to the number of isocyanate groups present in the arylene diisocyanate is from 0.65:2 to 1.0:2, said polyurethane product being stabilized against deterioration upon storage at low temperatures by the presence of a substituted urea having the formula R—NHCONH—R'NCO in which R represents a monovalent organic radical which is inert to isocyanate groups, said radical being selected from the group consisting of aliphatic and cycloaliphatic radicals containing at least 4 carbon atoms and R' is an arylene group, the amount of the said substituted urea being equivalent to from 0.05 to 2 parts by weight of the corresponding primary aliphatic amine $RNH_2$ per hundred parts of polyurethane product.

4. A fluid polyurethane product consisting essentially of the reaction product of 85 parts by weight of castor oil, 15 parts by weight of a polyethylene glycol of molecular weight below about 250, and 100 parts by weight of a tolylene diisocyanate, the said polyurethane product being stabilized against deterioration upon storage at low temperatures by the presence of the amount of substituted urea obtained by reacting from 0.05 to 2 parts by weight per hundred parts of the aforesaid polyurethane product of a primary aliphatic mono amine containing at least 4 carbon atoms with an excess of a tolylene diisocyanate.

5. The process of stabilizing a fluid polyurethane product containing the reaction product of a fatty acid triglyceride having a hydroxyl number of from 49 to 180, said triglyceride being selected from the group consisting of castor oil and blown drying oils, and of an arylene diisocyanate, said fluid polyurethan product being substantally free of urea linkages and containing unreacted arylene diisocyanate and being capable of reacting with water to form a cellular reaction product, against deterioration upon storage at low temperatures which comprises incorporating therewith from 0.05 to 2% by weight of a primary aliphatic mono amine containing at least 4 carbon atoms.

6. The process of claim 5 in which the polyurethane product consists essentially of the reaction product of 85 parts by weight of castor oil, 15 parts by weight of a polyethylene glycol of molecular weight below about 250, and 100 parts by weight of a tolylene diisocyanate.

7. The process of stabilizing a fluid polyurethane product containing the reaction product of a fatty acid triglyceride having a hydroxyl number of from 49 to 180, said triglyceride being selected from the group consisting of castor oil and blown drying oils, and of an arylene diisocyanate, said fluid polyurethane product being substantially free of urea linkages and containing unreacted arylene diisocyanate and being capable of reacting with water to form a cellular reaction product, against deterioration upon storage at low temperatures which comprises providing in intimate contact therewith a substituted urea having the formula R—NHCONH—R'NCO in which R represents a monovalent organic radical which is inert to isocyanate groups, said radical being selected from the group consisting of aliphatic and cycloaliphatic radicals containing at least 4 carbon atoms and R' is an arylene group, the amount of substituted urea being equivalent to from 0.05 to 2 parts by weight of the corresponding primary amine $RNH_2$ per hundred parts of polyurethane product.

References Cited in the file of this patent
UNITED STATES PATENTS

| | | |
|---|---|---|
| 2,612,166 | Schmidt et al. | Dec. 9, 1952 |
| 2,702,797 | Rugg | Feb. 22, 1955 |
| 2,772,245 | Simon et al. | Nov. 27, 1956 |

OTHER REFERENCES

Chemical Engineering, April 1950, pages 165–166.

UNITED STATES PATENT OFFICE
CERTIFICATE OF CORRECTION

Patent No. 2,877,193                                      March 10, 1959

Philip A. Roussel

It is hereby certified that error appears in the printed specification of the above numbered patent requiring correction and that the said Letters Patent should read as corrected below.

Column 1, line 66, after "that" insert -- a --; column 6, line 46, for "products" read -- product --; column 7, line 38, for "polyurethan" read -- polyurethane --; column 8, line 35, list of references cited, under the heading, "UNITED STATES PATENTS", for the patent number "2,612,166" read -- 2,621,166 --.

Signed and sealed this 30th day of June 1959.

(SEAL)
Attest:

KARL H. AXLINE
Attesting Officer

ROBERT C. WATSON
Commissioner of Patents